(12) United States Patent
Shingler

(10) Patent No.: US 6,488,022 B2
(45) Date of Patent: *Dec. 3, 2002

(54) PORTABLE OUTDOOR COOKER

(76) Inventor: Robert A. Shingler, 7997 SW. 189th Ave., Beaverton, OR (US) 97007

( * ) Notice: Subject to any disclaimer, the term of this patent is extended or adjusted under 35 U.S.C. 154(b) by 0 days.

This patent is subject to a terminal disclaimer.

(21) Appl. No.: 09/741,209

(22) Filed: Dec. 19, 2000

(65) Prior Publication Data

US 2001/0018914 A1 Sep. 6, 2001

Related U.S. Application Data

(63) Continuation-in-part of application No. 09/519,679, filed on Mar. 6, 2000, now Pat. No. 6,189,530.

(51) Int. Cl.$^7$ ................................................. A47J 37/00
(52) U.S. Cl. ......................... 126/41 R; 126/40; 126/50; 126/51; 99/425; 99/445; 99/446; 99/447
(58) Field of Search ............................... 126/41 R, 39 J, 126/39 H, 40, 50, 51, 39 N; 99/425, 400, 445, 446, 444, 447; 219/386, 439, 520, 521; 431/328, 329, 281, 284

(56) References Cited

U.S. PATENT DOCUMENTS

| 3,606,612 A | * | 9/1971 | Reid, Jr. ................. 431/281 |
| 3,843,313 A | * | 10/1974 | Helgeson ................. 431/329 |
| 4,342,259 A | * | 8/1982 | Lee ..................... 126/41 R |
| 5,127,824 A | * | 7/1992 | Barker ................... 431/284 |
| 6,189,530 B1 | * | 2/2001 | Shingler ................. 126/41 R |

* cited by examiner

Primary Examiner—James C. Yeung
(74) Attorney, Agent, or Firm—Kolisch Hartwell Dickinson McCormack & Heuser

(57) ABSTRACT

A portable outdoor cooker for cooking foods is provided. The cooker comprises a substantially circular heat transfer plate, a plurality of individually controllable burners disposed beneath the heat transfer plate, and a frame assembly for supporting the heat transfer plate and burners above the ground and in relation to one another. The heat transfer plate has a center and a perimeter, and includes a cooking surface. The plurality of burners includes an inner burner and an outer burner, the outer burner being positioned adjacent the perimeter of the heat transfer plate and the inner burner being positioned closer to the center of the heat transfer plate than the outer burner such that the cooking surface can be made hotter adjacent the perimeter of the heat transfer plate than adjacent the center of the heat transfer plate.

21 Claims, 7 Drawing Sheets

PORTABLE OUTDOOR COOKER

RELATED APPLICATIONS

This application is a continuation-in-part of U.S. patent application Ser. No. 09/519,679, filed Mar. 6, 2000, now U.S. Pat. No. 6,189,530, the disclosure of which is incorporated by reference herein.

TECHNICAL FIELD

The invention relates to a portable cooker for cooking and heating foods. More particularly, the invention is directed to a cooker with a burner arrangement that offers improved temperature control across the cooking surface.

BACKGROUND OF THE INVENTION

Many types of portable outdoor cookers or stoves are available. The most common variety provides an open grill located over a heat source such as charcoal or gas burners. One problem with this type of outdoor cooker is that the juices from the cooking food fall on the heating elements, causing the flames to flare up and associated uneven heating. This can dry out and sometimes burn the food and can be dangerous.

It is also known to provide a solid griddle surface on a cooker for preparing food. However, known griddle designs have several potential drawbacks. First, when using a griddle, foods tend to set in their own juices during cooking. In some cases this can result in food that is overly greasy. Second, known griddle cooker designs tend to concentrate heat underneath the center of the griddle, and not to allow the temperature of the outer edges of the griddle to be adjusted relative to the center of the griddle. Thus, these designs are limited for use in simultaneously cooking different foods at different, controlled temperatures.

One type of cooking surface, known as a Mongolian grill, overcomes some of the limitations of both the open grill and the solid griddle. A Mongolian grill has a solid, slightly convex cooking surface that causes the juice to run off the surface rather than fall onto the heating element. Unfortunately, these cooking surfaces have only been available for use in permanent installations. These expensive iron grills are about 50 inches in diameter and are very large and heavy units which are not portable (i.e., moved from place to place easily by one person). Because of the size, cost and design of these cookers they cannot be used as a portable outdoor cooker.

SUMMARY OF THE INVENTION

The present invention provides a portable outdoor cooker for cooking foods. The cooker comprises a substantially circular heat transfer plate, a plurality of individually controllable burners disposed beneath the heat transfer plate, and a frame assembly for supporting the heat transfer plate and burners above the ground and in relation to one another. The heat transfer plate has a center and a perimeter, and includes a cooking surface. The plurality of burners includes an inner burner and an outer burner, the outer burner being positioned adjacent the perimeter of the heat transfer plate and the inner burner being positioned closer to the center of the heat transfer plate than the outer burner such that the cooking surface can be made hotter adjacent the perimeter of the heat transfer plate than adjacent the center of the heat transfer plate.

DETAILED DESCRIPTION OF THE DEPICTED EMBODIMENTS

Figure 1:
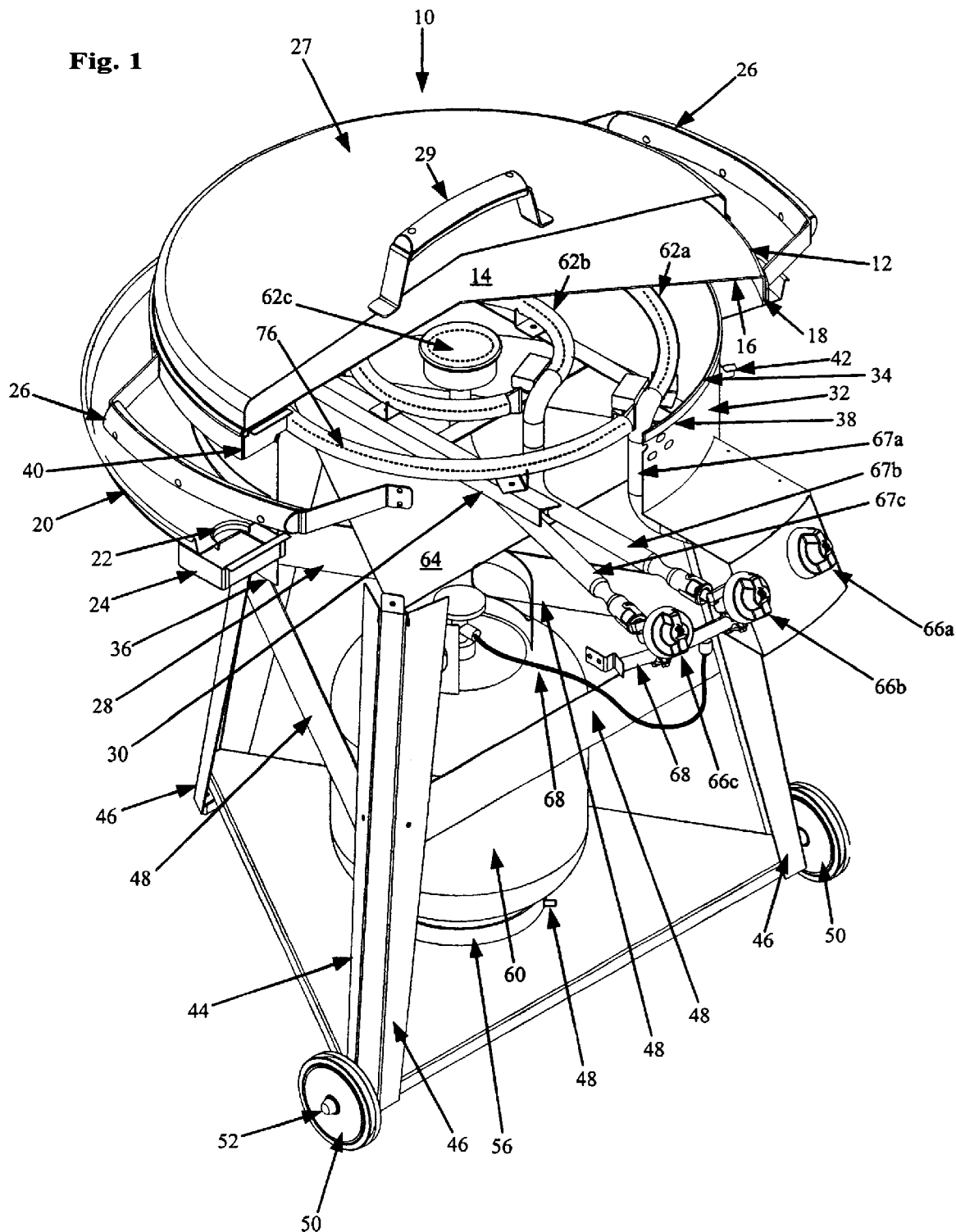
FIG. 1 is a perspective view of a first embodiment of a portable outdoor cooker according to the present invention, showing a partially broken-away heat transfer plate and cover.

A portable outdoor cooker constructed according to the preferred embodiment of the present invention is indicated generally at 10 in FIG. 1. Cooker 10 includes a round, sheet-like heat transfer plate 12 with an upwardly facing convex cooking surface 14, an opposed lower surface 16, and a downwardly dependent outer rim 18 disposed about the perimeter of the surfaces. A drip pan 20 is disposed under the outer rim to collect any juice that may run off the outer rim. Drip pan 20 includes at least one waste hole 22 positioned over a receptacle 24 for collecting waste from the drip pan. Heat transfer plate 12 includes at least one handle 26 to facilitate manual movement of the heat transfer plate between an operative position on the cooker, as shown in FIG. 1, and an inoperative position removed from the cooker. A cover 27 may be used to protect cooking surface 14 when the grill is not in use, and to allow the cooking surface to be covered while food is being cooked to trap heat. A handle 29 may be attached to cover 27 to make cover 27 easier to manipulate. While the heat transfer plate of the depicted embodiment is generally round, it will be appreciated that the heat transfer plate may be any desired shape.

Figure 3:
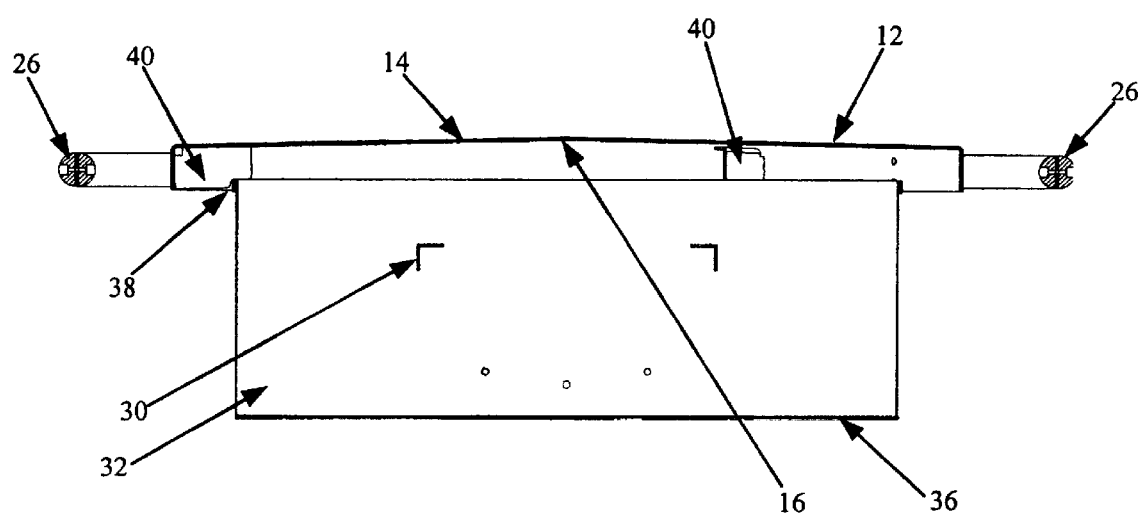
FIG. 3 is a side elevational view of the heat transfer plate and a portion of the frame assembly of the embodiment of FIG. 1.

In the embodiment depicted in FIG. 1, the convex cooking surface has a height of convexity between ⅛ of an inch and 2 inches. The convexity of the cooking surface is illustrated in FIG. 3. The diameter of the convex cooking surface is preferably between 18 and 36 inches in diameter, with 30 inches believed to be an optimal balance of cooking surface area and weight. While larger diameters provide more cooking area, it is believed that a surface larger than 36 inches would be too heavy and require too much heat to be suitable for use in a portable device. In order to minimize weight, a lightweight yet rigid material, such as formed mild steel, stainless steel or aluminum, is used for constructing the heat transfer plate. It is believed that the heat transfer plate must weigh less than 60 pounds to be manually moveable and more preferably less than 45 pounds.

Cooker 10 also includes a frame assembly 28 that supports various parts of cooker 10. Frame assembly 28 includes burner supports 30, a shell 32 with open top and bottom ends 34 and 36, and a suspension device, such as a support ring 38, mounted along the upper portion of shell 32. Burner supports 30 are disposed within shell 32. Suspension device or support ring 38 is configured to support and position heat transfer plate 12. This can be accomplished in any suitable manner. In the preferred embodiment, as shown in FIG. 3, bottom surface 16 of heat transfer plate 12 includes one or more alignment brackets 40 configured to accept precisely support ring 38. When heat transfer plate 12 is in the operative position, alignment brackets 40 center heat transfer plate 12 on support ring 38. The size and position of alignment brackets 40 prevent heat transfer plate 12 from tipping off support ring 38. Furthermore, the size and position of alignment brackets 40 are configured to cause a symmetrical discharge of exhaust fumes from burner fuel combustion. Thus the heated air and combustion products from the burner are guided through the space beneath bottom surface 16 of heat transfer plate 12 to evenly heat the cooking surface.

Shell 32 includes three L-shaped brackets 42, best seen in FIG. 1, which center and support drip pan 20 so that drip pan 20 is disposed in the proper location just below the downward rim 18 of heat transfer plate 12. The size and position of drip pan 20 serve as a barrier to help prevent bodily approach to the heated cooking surface.

Frame assembly 28 also includes a stand 44, which preferably includes three legs 46. In the preferred embodiment, legs 46 are made of formed sheet metal to provide adequate support and stability to heat transfer plate 12. However, legs 46 may also be made of any suitable material that will provide strength to the stand, especially while cooker 10 is being moved. Legs 46 are further strengthened and supported by struts 48. Two wheels 50 are attached to an axle 52 that is joined to the lower ends of two legs 46. Wheels 50 facilitate movement of the cooker from one place to another. A utility rack 54 mounted to the lower portions of legs 46 contains axle 52. Utility rack 54 may include a liquid propane bottle mounting bracket 56 and a liquid propane bottle securing clamp assembly 58. Preferably, liquid propane bottle securing clamp assembly 58 includes thumbscrews that clamp an American National Standards Institute ANSI certified LP bottle 60.

Figure 2:
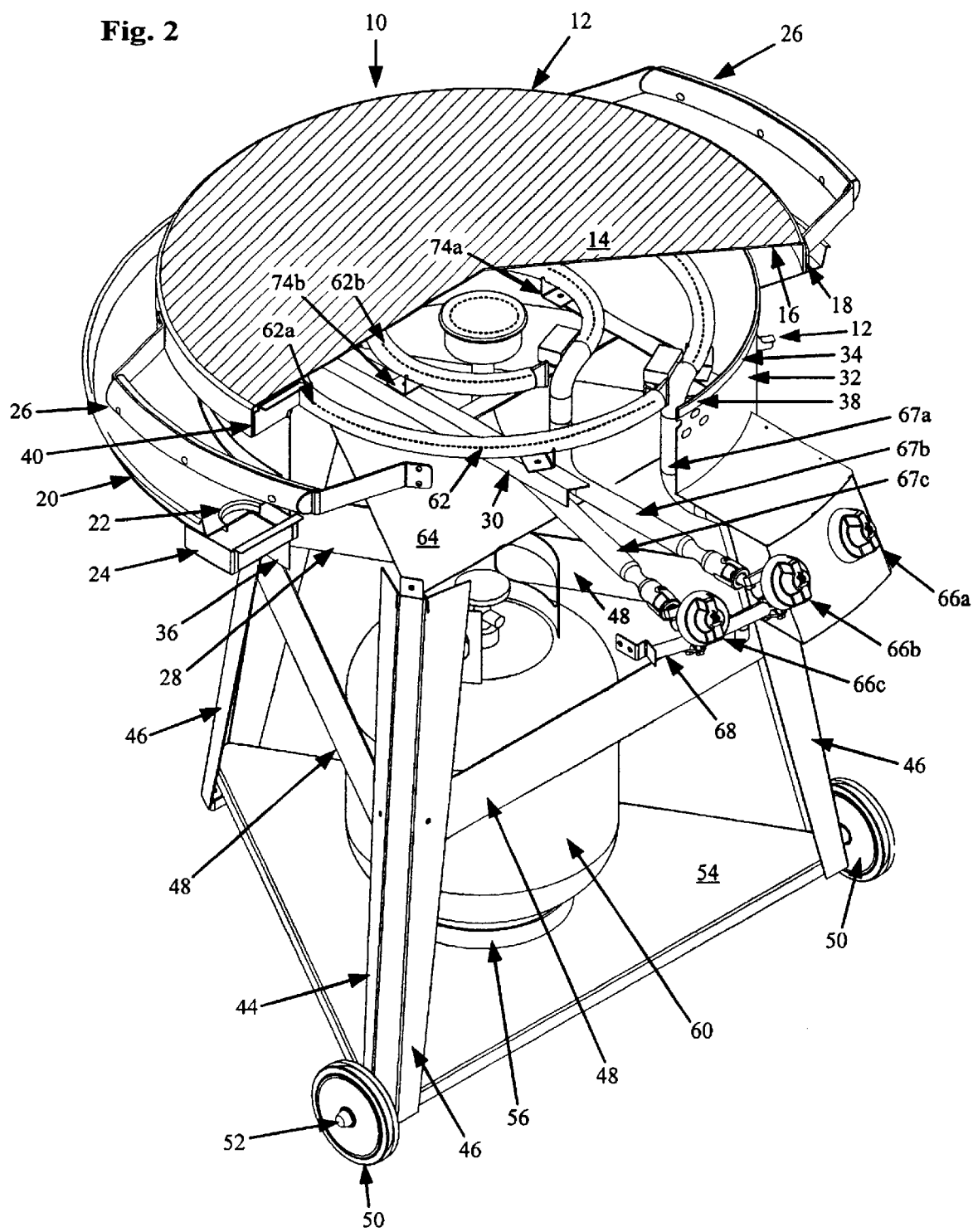
FIG. 2 is a perspective view of the embodiment of FIG. 1, with the cover removed.
Figure 4:
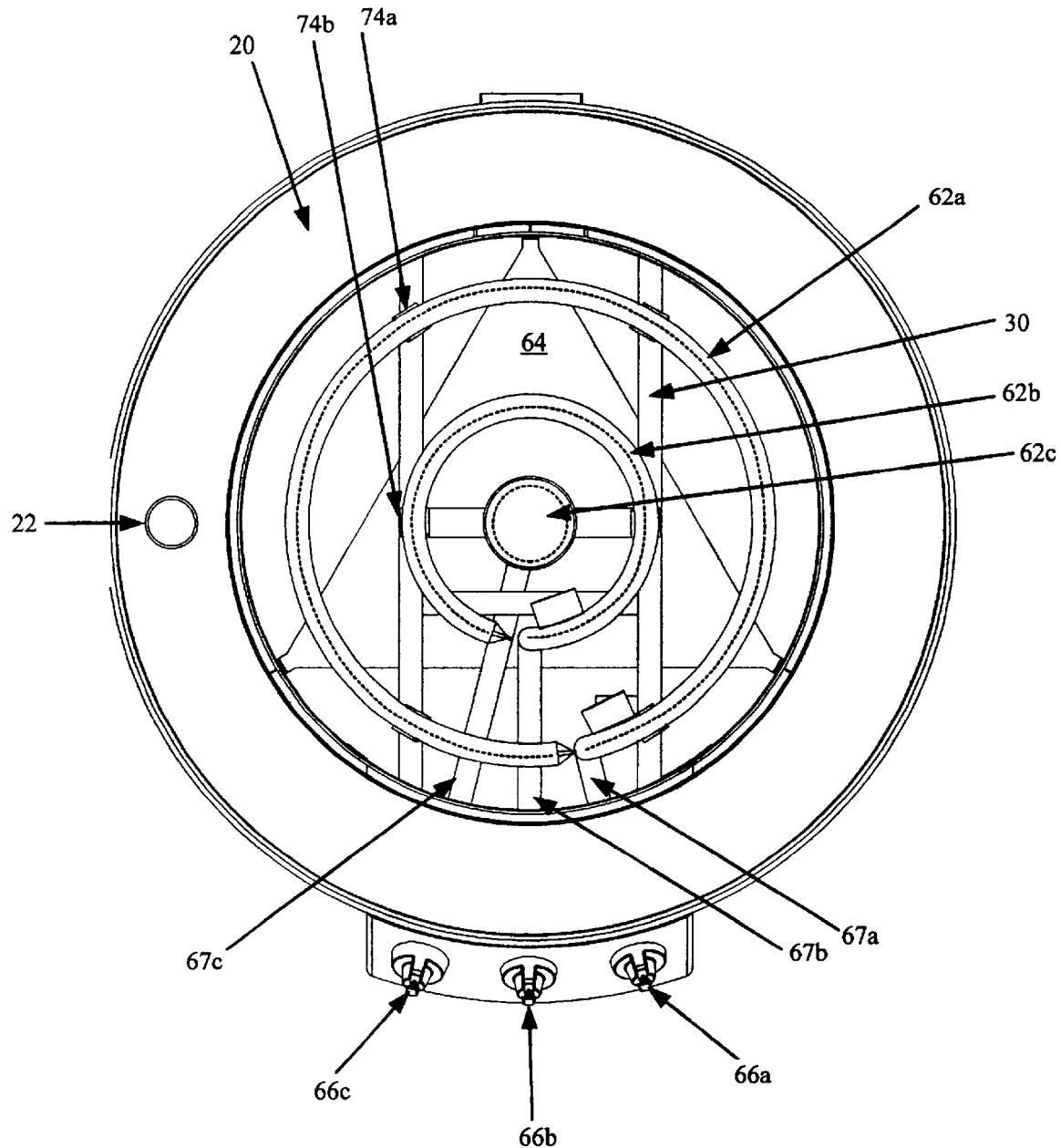
FIG. 4 is a top view of the drip pan, heating elements, valves and shell of the embodiment of FIG. 1.

Cooker 10 also includes two or more individually controllable burners, shown in FIGS. 1–2 and 4 as burners 62a 62b, and 62c. Burners 62a–c are positioned beneath the heat transfer plate within shell 32. By locating burners 62a–c within shell 32, the shell is able to act as a wind deflector to prevent disturbance of the burner flames by wind. Burners 62a–c are also protected from the wind by a deflector 64 mounted within the shell and located just below the burners such that sufficient air flow may still pass through shell 32 for burner to operate properly. Burners 62a–c in the depicted embodiment each have a generally round shape, and are arranged in a nested configuration. Burners 62a–c may be concentric, or may be offset if desired. Furthermore, while the burners of the depicted embodiment have a generally round shape, they may have any other suitable shape that corresponds generally to the shape of heat transfer plate 12.

The location of burners 62a–c in cooker 10 offers improved heat distribution control compared to known portable outdoor cookers. As shown in FIGS. 1, 2 and 4, outer burner 62a is positioned beneath heat transfer plate 12 adjacent the perimeter of the heat transfer plate, inner burner 62c is positioned beneath the heat transfer plate adjacent the center of the heat transfer plate, and middle burner 62b is positioned between the outer and inner burners. Because the heat output of each burner is independently adjustable (as described in more detail below), this burner arrangement permits the temperature across the width of the cooking surface to be highly controllable. For example, it may be desirable for cooking surface 14 to be hotter adjacent the perimeter of heat transfer plate 12 than adjacent the center. This would allow foods first to be cooked adjacent the edge of the cooking surface, where juices can easily run off the edge, and then placed in the middle of the cooking surface once fully cooked to keep warm until consumed. Likewise, the temperature of cooking surface 14 may be made cooler adjacent the edge of heat transfer plate 12 than adjacent the center, or the temperature may be made uniform across the entire cooking surface.

In the preferred embodiment, the heat output of outermost burner 62a is controlled by a first gas valve 66a, the middle burner 62b by a second gas valve 66b, and the inner burner 62c by a third gas valve 62c. Valves 66a–c allow the heat output of each burner to be controlled by allowing the control of the flow of gas to burners 62a–c through gas lines 67a–c. All valves 66a–c are mounted to a gas manifold 68, which provides a precise gas pressure to each valve as supplied by gas line 70 connected to LP bottle 60. Furthermore, the gas line provides a regulated gas pressure to gas manifold 68. Though gas in burners 62 may be ignited through any desired means, such as by a match, preferably the three valves 66a–c automatically ignite the gas through the use of an integrated piezoelectric ignition system when the valves are turned on Alternatively, other types of valves that do not possess this feature may be used. Also, through the use of optional orifices fitted to gas valves 66a and 66b, natural gas may connected to the gas manifold and used to fuel burner 62.

Outer burner 62a is connected to burner supports 30 with burner brackets 74a. Outer burner 62a includes a plurality of apertures 76 aligned along the burner to distribute fuel. Similarly, middle burner 62b is connected to burner supports 30 with burner brackets 74b and also contains a plurality of apertures 76 aligned along the burner to distribute fuel.

Figure 5:
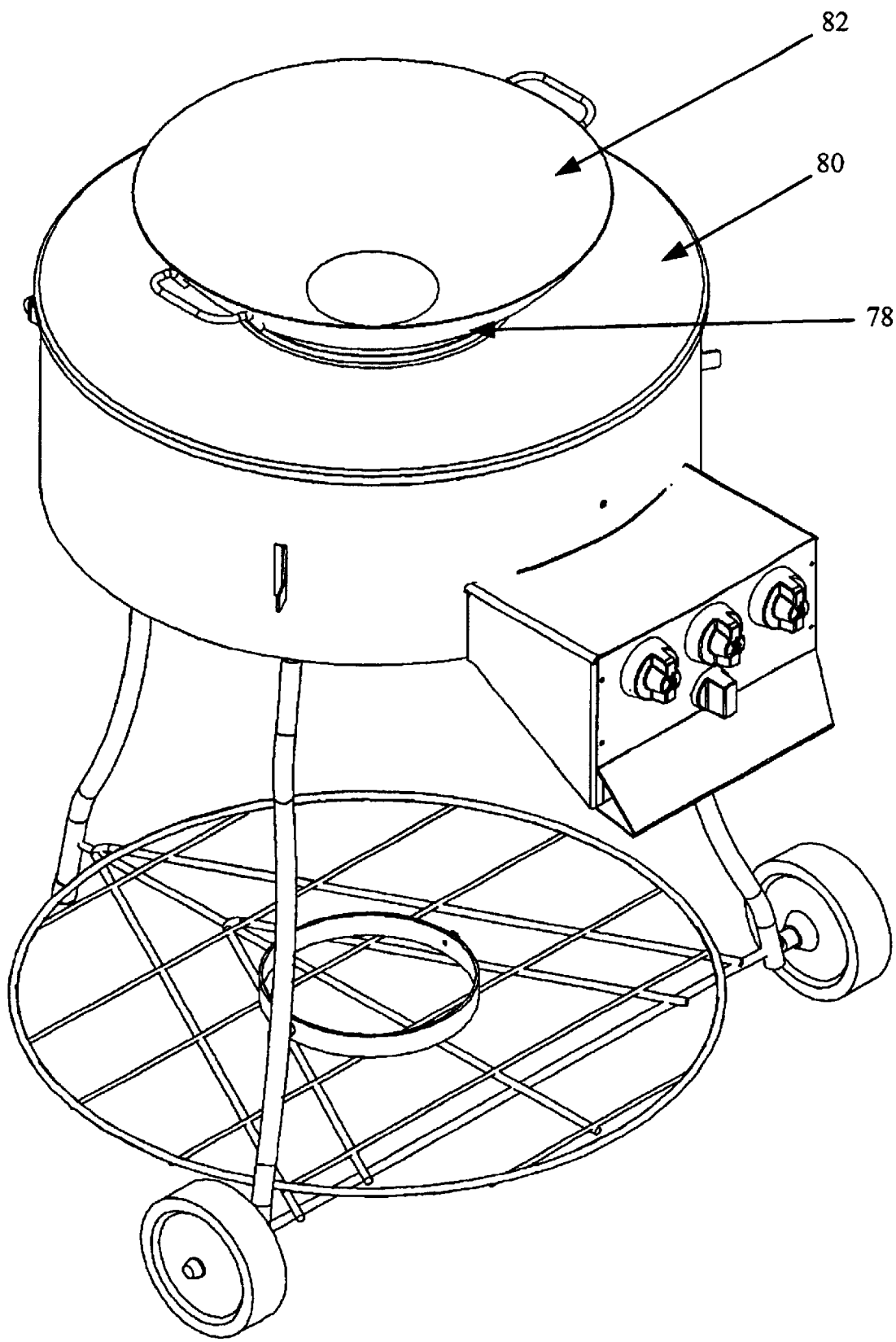
FIG. 5 is a perspective view of a second embodiment of a portable cooker according to the present invention, with an alternative cooking surface in the form of a wok.

FIG. 5 depicts another embodiment of the invention in which an adapter plate 78 is provided to fit on top of shell 32. Adapter plate 78, which is installed after removing heat transfer plate 12, has an opening 80 in the center which is suitable to support a wok 82 or another cooking surface. The heat to wok 82 may be controlled with valves 66a–c in the same manner as when heat transfer plate 12 is in use. In addition to wok 82, other adapters and cooking surfaces, such as an open grill, can be supplied to provide other cooking options.

Figure 6:
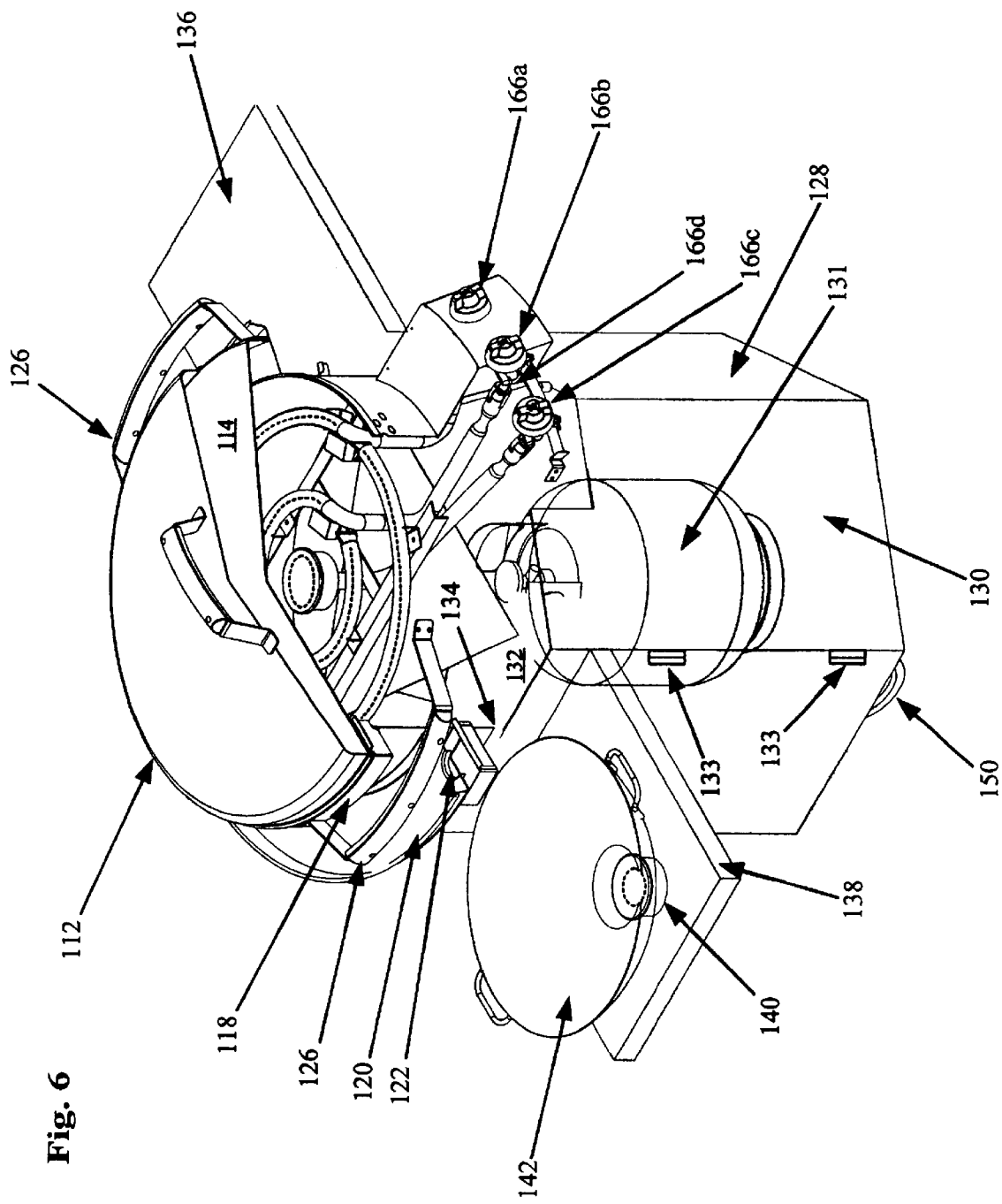
FIG. 6 is a perspective view of a third embodiment of a portable cooker according to the present invention.

A third embodiment of the present invention is shown generally in FIG. 6 at 110. Cooker 110 includes a heat transfer plate 112 with a generally convex cooking surface 114, as described above at 14 for the first embodiment of the invention. Heat transfer plate 112 also includes a rim 118 extending downwardly from the outer perimeter of heat transfer plate 112, and a drip pan 120 positioned below the lower edge of rim 118. Drip pan 120 includes a waste hole 122 that drains into a receptacle. Heat transfer plate 112 also includes at least one handle 126 for removing heat transfer plate 112 from the rest of cooker 110.

Cooker 112 also includes a frame assembly 128. Frame assembly 128 supports other parts of cooker 110, and protects the burners disposed within the frame assembly from wind. Frame assembly 128 includes a plurality of panels 130 joined together at the edges at angles to one another to form a solid enclosure about the burners. In the preferred embodiment, six panels 130 are joined in a hexagonal configuration. A liquid propane bottle 131 may be placed within the enclosure to provide a fuel supply for cooker 110. Also, two panels 130 may be coupled with a hinge 133 to allow one of the panels to be pivotally opened to allow access to the enclosure. Frame assembly 128 also includes a generally planar top surface 132 with an aperture 134 over which heat transfer plate 112 is mounted, and at least one work shelf 136 extending outwardly from one of panels 130. Work shelf 136 provides a general utility surface on which a user may place utensils, cut or prepare foods, or perform other tasks related to cooking. A second work shelf 138 may also be included on frame assembly 128. Second work shelf may also be simply another utility surface on which items may be placed, or it may include a shelf burner 140 configured to heat and support a cooking utensil, such as a wok 142. A gas line may be run through the interior of second shelf 138 to supply gas to shelf burner 140. In addition to valves 166a–c for controlling the burners within frame assembly 128, a fourth valve 166d may be included to control the flow of gas to shelf burner 140.

Figure 7:
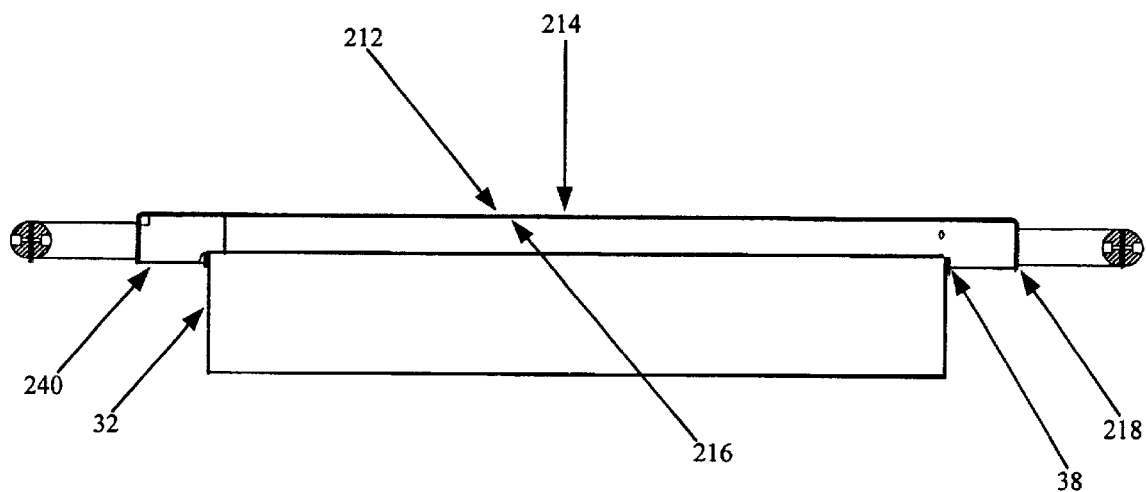
FIG. 7 is a side elevational view of a heat transfer plate according to a fourth embodiment of the present invention.

Cookers 10 or 110 may also employ a flat cooking surface. FIG. 7 shows a side elevational view of a flat heat transfer plate 212 mounted on shell 32. Heat transfer plate 212 includes a cooking surface 214, an opposed lower surface 216 and a downwardly dependent outer rim 218. One or more alignment brackets 240 are provided on lower surface 216 of heat transfer plate 212 to hold the heat transfer place on support ring 238. Flat heat transfer plate 212 enjoys the same advantages from the burner arrangement of cooker 10 as convex heat transfer plate 12, as different foods can simultaneously be cooked at different temperatures across the width of cooking surface 214 by simply controlling the amount of heat produced by each of burners 62a–c.

While the present invention has been particularly shown and described with reference to the foregoing embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

I claim:

1. A portable outdoor cooker for cooking foods, comprising:
   a substantially circular heat transfer plate, the heat transfer plate having a center and a perimeter and including a cooking surface;
   a plurality of individually controllable burners disposed beneath the heat transfer plate, the plurality of burners including an inner burner and an outer burner, the outer burner being positioned adjacent the perimeter of the heat transfer plate and the inner burner being positioned closer to the center of the heat transfer plate than the outer burner such that the cooking surface can be made hotter adjacent the perimeter of the heat transfer plate than adjacent the center of the heat transfer plate; and
   a frame assembly for supporting the heat transfer plate and burners above the ground and in relation to one another.

2. The portable outdoor cooker of claim 1, wherein the cooking surface is substantially flat.

3. The portable outdoor cooker of claim 1, wherein the cooking surface is convex and curved upwardly.

4. The portable outdoor cooker of claim 1, wherein the inner burner is generally round in shape.

5. The portable outdoor cooker of claim 1, wherein the outer burner includes a ring-like tubular portion that substantially surrounds the inner burner.

6. The portable outdoor cooker of claim 5, wherein the outer and inner burner are concentric.

7. The portable outdoor cooker of claim 1, further comprising a middle burner disposed between the outer burner and inner burner.

8. The portable outdoor cooker of claim 7, wherein the outer burner, middle burner and inner burner are concentric.

9. A portable outdoor cooker, comprising:
   a generally round, flat, sheet-like heat transfer plate, the heat transfer plate having a center and a perimeter and including a cooking surface;
   a plurality of burners disposed beneath the cooking surface, each of the burners having a generally circular shape, the plurality of burners being in a nested configuration with an inner burner positioned beneath the cooking surface adjacent the center of the cooking surface and an outer burner positioned beneath the cooking surface adjacent the perimeter of the cooking surface, each of the plurality of burners being individually controllable so that the cooking surface adjacent the perimeter of the heat transfer plate can be made hotter than the cooking surface adjacent the center of the heat transfer plate; and
   a frame for supporting the heat transfer plate and plurality of burners above the ground and in relation to one another.

10. The portable outdoor cooker of claim 9, wherein the inner and outer burners are concentric.

11. The portable outdoor cooker of claim 9, wherein the outer burner includes a generally circular hollow tube with a plurality of apertures configured to distribute flame to the heat transfer plate.

12. The portable outdoor cooker of claim 9, further comprising a middle burner disposed in a nested position between the inner burner and the outer burner.

13. A portable outdoor cooker for foods, comprising:
   a round, sheet-like heat transfer plate, the heat transfer plate having a center and a perimeter and including an upwardly-facing convex cooking surface;
   a plurality of burners disposed beneath the heat transfer plate, the plurality of burners including an inner burner disposed beneath the heat transfer plate adjacent the center of the heat transfer plate and an outer burner disposed beneath the heat transfer plate adjacent the perimeter of the heat transfer plate such that the cooking surface can be made hotter adjacent the perimeter of the heat transfer plate than adjacent the center of the heat transfer plate; and
   a frame assembly for supporting the heat transfer plate and the plurality of burners over the ground and in relation to one another.

14. The portable outdoor cooker of claim 13, wherein the burners are substantially circular in shape.

15. The portable outdoor cooker of claim 13, wherein the burners are in a nested arrangement relative to each other.

16. The portable outdoor cooker of claim 13, wherein the burners are concentric.

17. The portable outdoor cooker of claim 13, wherein the plurality of burners includes a middle burner disposed between the inner burner and the outer burner.

18. A portable outdoor cooker for cooking foods, comprising:
   a sheet-like heat transfer plate, the heat transfer plate having a center and a perimeter and including a cooking surface;
   a plurality of individually controllable burners disposed beneath the heat transfer plate, the plurality of burners including an inner burner and an outer burner in a nested, concentric arrangement, the outer burner being positioned adjacent the perimeter of the heat transfer plate and the inner burner being positioned closer to the center of the heat transfer plate than the outer burner; and a frame assembly for supporting the heat transfer plate and burners above the ground and in relation to one another.

19. The portable outdoor cooker of claim 18, wherein the heat transfer plate is substantially round.

20. The portable outdoor cooker of claim 18, wherein at least one of the plurality of burners is substantially round.

21. The portable outdoor cooker of claim 18, wherein each of the plurality of burners is substantially round.

* * * * *